H. P. MacLAGAN.
CASSETTE.
APPLICATION FILED SEPT. 21, 1918.

1,352,615.

Patented Sept. 14, 1920.

INVENTOR
Hector P. MacLagan
BY Albert C. Bell
ATTORNEY

UNITED STATES PATENT OFFICE.

HECTOR P. MacLAGAN, OF PARK RIDGE, ILLINOIS, ASSIGNOR TO McINTOSH BATTERY AND OPTICAL CO., OF CHICAGO, ILLINOIS, A CORPORATION OF ILLINOIS.

CASSETTE.

1,352,615.  Specification of Letters Patent.  Patented Sept. 14, 1920.

Application filed September 21, 1918. Serial No. 255,212.

*To all whom it may concern:*

Be it known that I, HECTOR P. MAC-LAGAN, a citizen of the United States, residing at Park Ridge, in the county of Cook and State of Illinois, have invented a certain new and useful Improvement in Cassettes, of which the following is a specification.

My invention relates to an improved construction of cassette for holding the dry plates used in making radiographs, it being the object of my invention to produce such a device that will positively protect the sensitive plate, be simple and strong in construction, easy to handle and of small thickness so that the patient will not be inconvenienced by its use. By my construction I provide simple and positive means for holding the cassette in closed position and for removing the plate from the cassette after the exposure.

My invention will best be understood by reference to the accompanying drawings showing a preferred embodiment thereof in which—

Similar numerals refer to similar parts throughout the several views.

Figure 1:
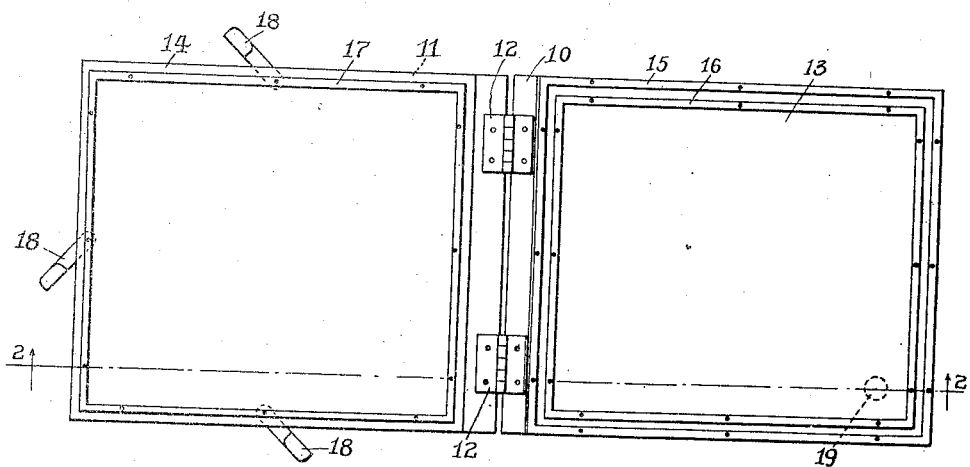
Figure 1 shows the cassette in open condition in inside plan view.
Figure 2:
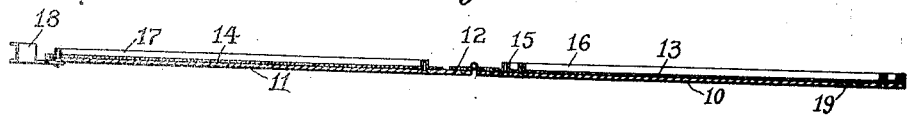
Fig. 2 is a sectional view of the parts shown in Fig. 1, taken along the line 2—2.

As shown in the drawings, the cassette consists of two plates of sheet metal 10 and 11, these being preferably of aluminum of only sufficient thickness to give the necessary strength to the device. These plates are connected by hinges 12 so that they may be moved near each other in parallel relation or away from each other to open the cassette as desired. The hinges serve to maintain a fixed relation of engagement between the plates when they are brought together.

The plate 10 is covered with a sheet of felt 13, preferably black in color, and on this felt two rectangular metal frames 15 and 16 are secured by screws through the plate 10 as indicated. The frame 16 is of a size to fit and readily receive within it the dry plate for which the cassette is designed, it being desirable to use different size cassettes for different size plates. The frame 15 is enough larger than the frame 16 to leave between the frames a groove substantially equal in cross section to the cross section of the metal bar forming each of the frames 15 and 16. The plate 11 is covered with a sheet of felt 14, preferably black in color, and on the felt a rectangular frame of bar metal 17 is secured by screws through the plate 11 as indicated. The frame 17 is of substantially the size of the groove between the frames 15 and 16 and the metal bar forming the frame 17 is of substantially the cross section of the cross section of said groove, as a result of which, when the plates 10 and 11 are brought together the frame 17 fits and substantially fills said groove, the proportions and disposition of the hinges 12 being such as to secure said relation of the frames.

When in closed condition, the plates 10 and 11 are held together by U-shaped catches 18 pivotally secured to the edge portions of the plate 11 so that by moving said catches outwardly the plate 11 is released and may be moved to its open position.

Figure 3:
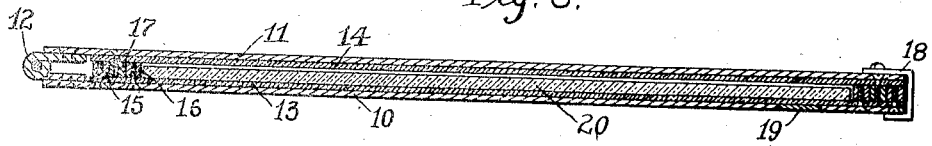
Fig. 3 is an enlarged sectional view similar to Fig. 2, the difference being that the cassette is shown in closed condition.

To readily remove the dry plate from the cassette after an exposure I provide a circular hole in the plate 10 inside of one corner of the frame 16, which hole is filled by a disk 19 of metal, preferably of the same material and thickness as the plate 10. The disk loosely fits the hole containing it and is cemented to the felt 13 which permits it to be pressed inward by the finger sufficiently to lift the corner of the dry plate, shown at 20 in Fig. 3, so that said plate is slightly above the frame 16 and may readily be grasped and removed.

As a result of the construction described it will appear that my construction has a thickness substantially equal to the combined thickness of the plates 10 and 11, the sheets of felt 13 and 14 and the dry plate 20, and that therefore the cassette may be made quite thin. The interengagement of the rectangular frames provides as the only path along which light leakage can take place, a path having sharp right angle turns and this path is in large part obstructed by the felt engaging the frames. The felt also serves to effectively seal the joints between the parts including the joint around the disk 19.

While I have shown my invention in the particular embodiment above described, I do not limit myself to this construction, as I may employ any equivalent thereof known to the art at the time of the filing of this application, without departing from the scope of the appended claims.

What I claim is:

1. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, sheets of light proof material on the inner surfaces of said plates between said plates and said frames, one of said plates having an aperture therein within the innermost of said frames, and a plug loosely fitting said aperture and secured to the adjacent sheet of light proof material.

2. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, and sheets of light proof material on the inner surfaces of said plates between said plates and said frames, one of said plates having an aperture therein within the innermost of said frames for removing the dry plate from the cassette.

3. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, and sheets of light proof material on the inner surfaces of said plates between said plates and said frames.

4. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, sheets of light proof felt on the inner surfaces of said plates between said plates and said frames, one of said plates having an aperture therein within the innermost of said frames, and a plug loosely fitting said aperture and secured to the adjacent sheet of felt.

5. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, and sheets of light proof felt on the inner surfaces of said plates between said plates and said frames, one of said plates having an aperture therein within the innermost of said frames for removing the dry plate from the cassette.

6. In a cassette, the combination of two plates hinged together to lie adjacent each other in substantially parallel planes in closed position, rectangular frames conformed to nest in one another, alternate ones of said frames being secured to one of said plates and an intermediate one of said frames being secured to the other of said plates, and sheets of light proof felt on the inner surfaces of said plates between said plates and said frames.

7. In a cassette, the combination of two plates, devices carried by said plates for forming a light proof dry plate receptacle between said two plates, one of said plates having an aperture therein communicating with said receptacle, and flexible light proof material carried by said one plate covering said aperture.

8. In a cassette, the combination of two plates, devices carried by said plates for forming a light proof dry plate receptacle between said plates, one of said plates having an aperture therein communicating with said receptacle, flexible light proof material carried by said one plate covering said aperture, and a plug loosely fitting said aperture and secured to said flexible material.

9. In a cassette, the combination of two plates, devices carried by said plates for forming a light proof dry plate receptacle between said plates, one of said plates having an aperture therein communicating with said receptacle, flexible light proof material carried by said one plate covering said aperture, and catches for holding said plates adjacent each other to close said receptacle.

10. In a cassette, the combination of two plates hinged together to lie adjacent each other in substantially parallel planes in closed position, and continuous rectangular frames conformed to nest in one another, a first one of said frames being secured to one of said plates and another of said frames fitting said first frame being secured to the other of said plates and forming a light proof dry plate receptacle within said frames when the cassette is closed.

In witness whereof, I hereunto subscribe my name this 16th day of September, A. D. 1918.

HECTOR P. MacLAGAN.